(12) United States Patent
Justice et al.

(10) Patent No.: US 10,495,515 B2
(45) Date of Patent: Dec. 3, 2019

(54) ADAPTIVE, VERY HIGH RESOLUTION IMAGING SPECTROMETER

(71) Applicant: Irvine Sensors Corporation, Costa Mesa, CA (US)

(72) Inventors: James Justice, Huntington Beach, CA (US); Medhat Azzazy, Laguna Niguel, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 0 days.

(21) Appl. No.: 15/924,515

(22) Filed: Mar. 19, 2018

(65) Prior Publication Data

US 2019/0094073 A1    Mar. 28, 2019

Related U.S. Application Data

(60) Provisional application No. 62/474,170, filed on Mar. 21, 2017.

(51) Int. Cl.
  *G01J 3/28* (2006.01)
  *G01J 3/02* (2006.01)
  *G01J 3/06* (2006.01)
  *G01J 3/18* (2006.01)

(52) U.S. Cl.
  CPC .......... *G01J 3/2823* (2013.01); *G01J 3/0235* (2013.01); *G01J 3/0237* (2013.01); *G01J 3/06* (2013.01); *G01J 3/18* (2013.01); *G01J 3/2803* (2013.01); *G01J 2003/2806* (2013.01); *G01J 2003/2813* (2013.01); *G01J 2003/2826* (2013.01)

(58) Field of Classification Search
  CPC ...... G01J 3/2823; G01J 3/0235; G01J 3/0237; G01J 2003/2806; G01J 3/2813; G01J 3/2826
  USPC ........................................................ 356/326
  See application file for complete search history.

(56) References Cited

U.S. PATENT DOCUMENTS

| | | | | |
|---|---|---|---|---|
| 6,643,065 | B1 * | 11/2003 | Silberman ................. | G01J 3/18 359/230 |
| 2002/0135761 | A1 * | 9/2002 | Powell ...................... | G01J 3/02 356/316 |
| 2008/0061238 | A1 * | 3/2008 | Hok ..................... | G01N 21/3504 250/340 |
| 2015/0153156 | A1 * | 6/2015 | Shah ......................... | G01J 3/36 356/456 |
| 2019/0204577 | A1 * | 7/2019 | Faris .................. | G02B 21/0088 |

* cited by examiner

*Primary Examiner* — Hina F Ayub
(74) *Attorney, Agent, or Firm* — W. Eric Boyd, Esq.

(57) ABSTRACT

A spectrometer for capturing two dimensional images of observed scenes in a sequence of spectral sub-bands wherein each measurement of a sub-band occurs over a two dimensional detector array at the same time. Sub-band measurement sequences are executed based upon, a) environmental conditions, b) user priorities, and, c) results of real-time analysis of the two dimensional spectral scene data outputs from the sensor.

8 Claims, 4 Drawing Sheets

Block Diagram of the Adaptive, High Resolution Imaging Spectrometer Concept and its control mechanisms

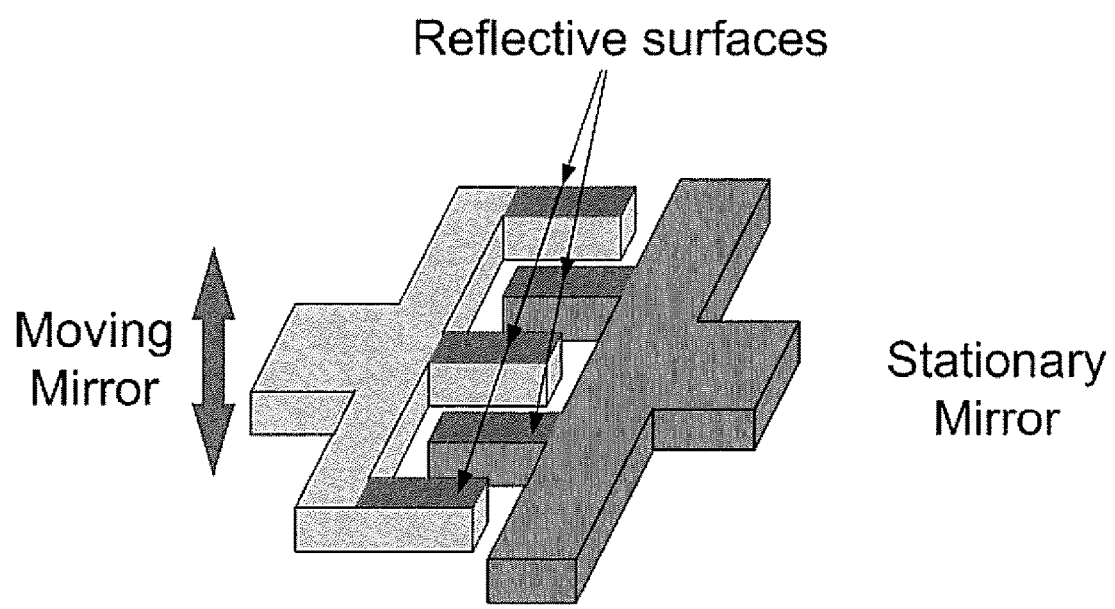
Figure 1. Adaptive grating interferometer

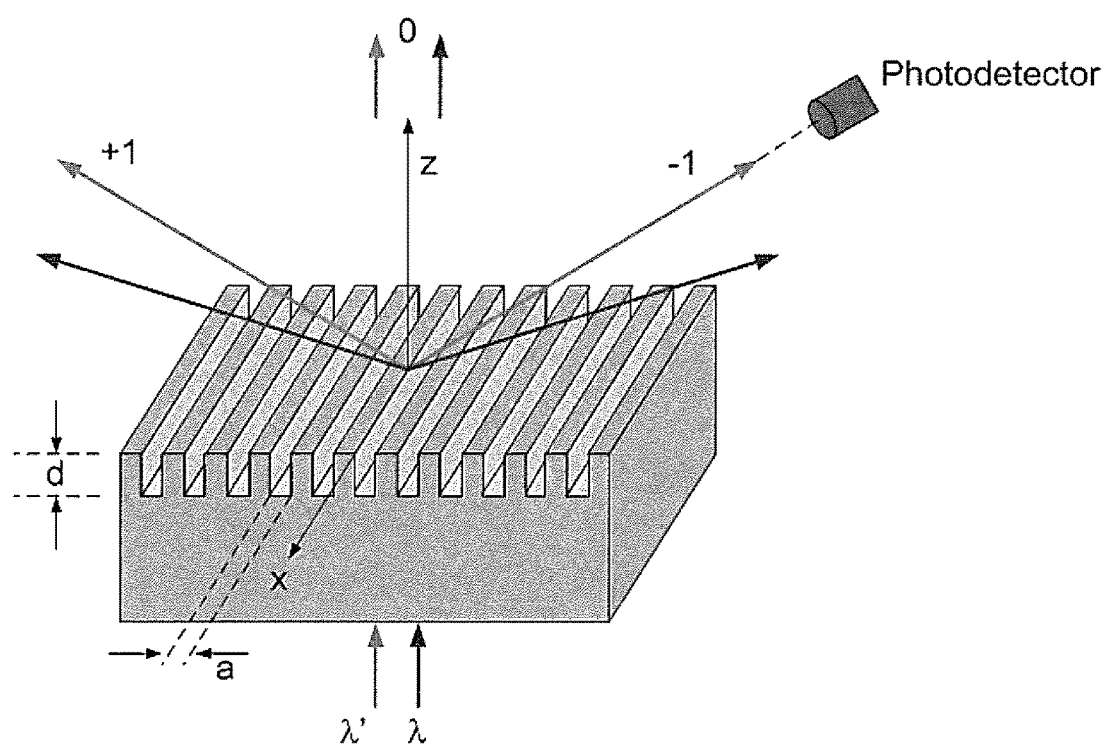
Figure 2. Diffraction pattern created by the adaptive grating

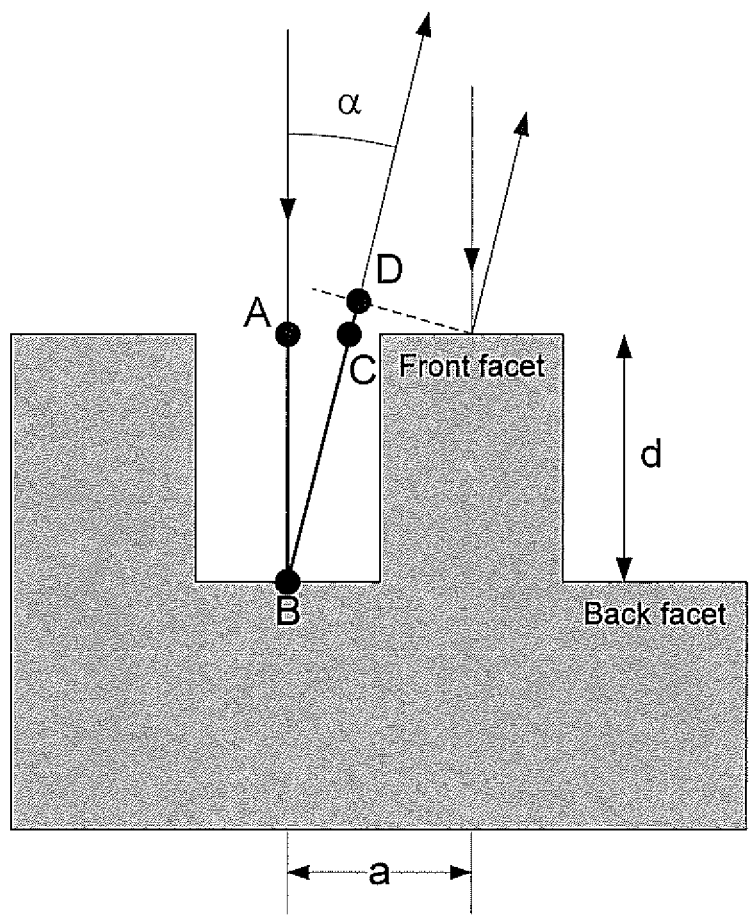
Figure 3. Schematic of the adaptive grating interferometer

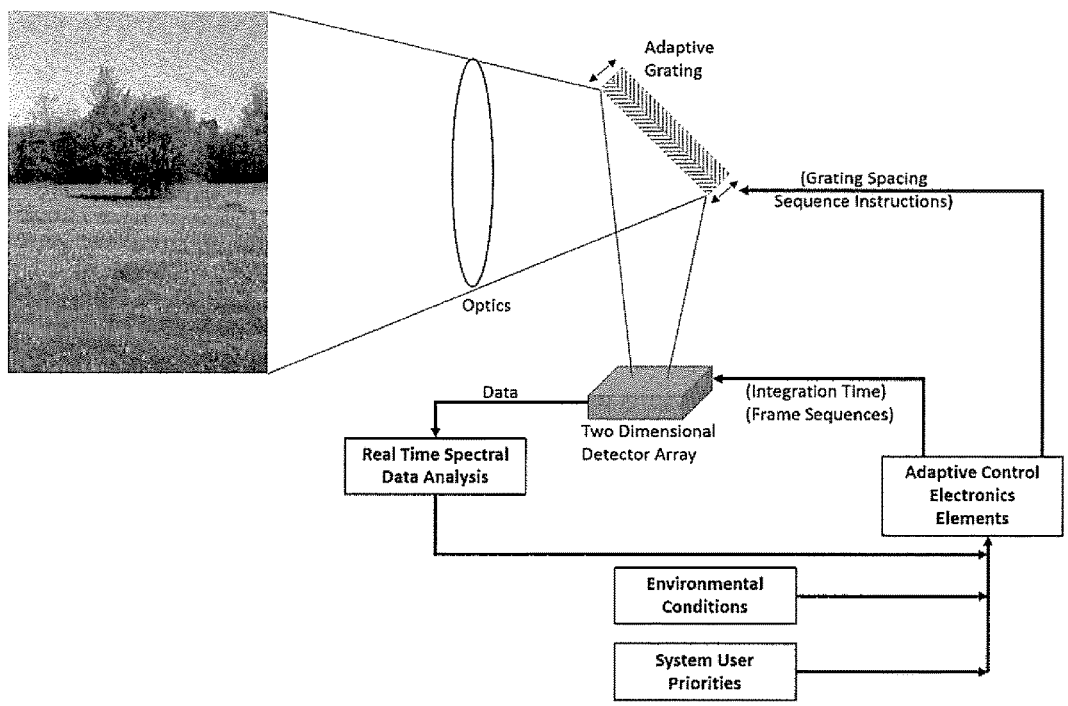
Figure 4. Block Diagram of the Adaptive, High Resolution Imaging Spectrometer Concept and its control mechanisms

ADAPTIVE, VERY HIGH RESOLUTION IMAGING SPECTROMETER

CROSS-REFERENCE TO RELATED APPLICATIONS

This application claims benefit of U.S. Provisional Patent Application No. 62/474,170 filed on Mar. 21, 2017 entitled "An Adaptive, Very High Resolution Imaging Spectrometer", pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of electro-optical sensors that operate in multiple spectral bands.

More specifically, the invention relates to an electro-optical sensor that operates on a large imaging field of view and measures the spectral content of the entire image field of view in a series of sequentially sampled, selectable spectral sub-bands whose operation is adaptable in real-time based on analysis of measured image content, on environmental conditions and on the instrument user-defined priorities for obtaining information.

2. Brief Description of the Prior Art

Imaging spectrometers generally operate with an array of detectors each of which is seeing different spectral content as the sampled light is spectrally dispersed across the array by an optical element such as a prism or diffraction grating. The array is then scanned over an image field of view thus creating images of the field of view in spectral sub-bands. Such sensor systems may operate in spectral sub-bands of varying spectral width and are described as "multispectral imagers" if the sub-bands are fairly wide and as "hyperspectral imagers" if the sub-bands are very narrow. This class of imaging spectrometer does not provide a map of the intensity content of a spectral sub-band obtained over a large image field that is obtained at the same instant of time, i.e., in real time. An additional sensing technique, Fourier interferometry, makes use of spatial patterns to modulate the image fields in time thus encoding various spectral band content into different temporal frequencies that can be detected and isolated creating spectral sub-band maps. This technique requires the creation of interference patterns that make such sensor systems inefficient and still does not provide a spectral sub-band image across the field of view at the same instant of time. In the current state of the art of imaging spectrometers, adaptive control for how the instrument allocates its time between various spectral regions is determined by the hardware elements of the sensor design and does not permit adaptive control of the spectral sampling.

What is needed is a high resolution imaging spectrometer that can obtain a spectral sub-band image across a large field of view at a single instant of time. Further, the high resolution imaging spectrometer should be capable of rapidly and sequentially obtaining many sub-bands of images across a large field of view in a temporal sequence of images. Such an instrument will provide full spatial, temporal, and spectral maps of a large imaging field of view, preserving the maximum information content of the observed field of view. This class of instrument will produce a very large amount of data, much of which is often not relevant to the data being taken by the instrument. Adaptive control of how the spectral data is taken to maximize the effectiveness of data-taking based on observing conditions and user priorities is needed.

BRIEF SUMMARY OF THE INVENTION

The adaptive, very high resolution imaging spectrometer disclosed herein uses a dynamically and precisely controlled, two dimensional diffraction grating that produces a narrow spectral image across a large two dimensional field of view at a single time. The spacing of the grating elements in the two dimensional diffraction grating determines the spectral sub-band being measured and is controlled by a precision actuation mechanism.

Each position of the grating spacing produces a different spectral sub-band that is observed by a two dimensional detector array that fills the desired field of view. Sequential sub-band samples of the imaged field of view are taken as the grating spacing is changed to a different position. Adaptive control of the high resolution imaging spectrometer data output is achieved by fine temporal coordination between the grating spacing value and the detector array integration time and sampling sequence. The sequence of grating locations is controlled to produce the spectral sub-band images of particular importance to the sensor user. The data sequence can also be adapted to observing conditions and to actual analysis of the output data content.

In a first aspect of the invention, as sensing apparatus is disclosed in the form of an adaptive spectral imaging sensor system that observes a two dimensional scene and focuses light on a two dimensional, electronically controlled, variable spacing grating that produces very high resolution spectral images of observed scenes measured with a two dimensional detection array. In the first aspect, the array measures the two dimensional scene being observed in a single spectral sub-band at the same time over the two dimensional observed field of view.

In a second aspect of the invention, the variable spacing grating may be controlled by a sequence of pre-determined or user-defined instructions that may determine the sequence of specific grating spacings that results in a sequence of observed specific spectral sub-bands over the two dimensional array of detectors. In this second aspect, each spectral sub-band may be observed over the entire two dimensional detector array at a single time.

In a third aspect of the invention, the variable spacing grating may have its varying spatial separation positions effected by MEMS-driven spacing elements.

In a fourth aspect of the invention, the variable spacing grating may be controlled by a pre-determined or user-defined sequence of instructions that determine the integration time for each of the spectral sub-band observations.

In a fifth aspect of the invention, the determined or user-defined sequence of instructions may be generated by an electronic processing element that determines or computes the sequence and duration of spacings based upon knowledge or sensor inputs of environmental conditions which determine the visibility limits in each sub-band imposed by the environmental conditions.

In a sixth aspect of the invention, the determined or user-defined sequence of instructions of may be generated at least in part by a spectral analysis of the observed sub-band two dimensional images using spectral template matching and/or anomaly detection for determining the material content of areas being observed.

In a seventh aspect of the invention, the spectral analysis may be performed in real-time on sensors outputs using an electronic processing unit to provides sequencing instructions to an adaptive grating electronic control element to define the sequence and duration of the spacings.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 1 depicts the two dimensional spectral grating of the invention that, at a given spacing of the movable grating, produces a respective intensity pattern over the full two dimensional field of view at a given time interval.

FIG. 2 illustrates the formation of the diffraction pattern by the grating in a horizontal view.

FIG. 3 illustrates the formation of the diffraction pattern in a vertical cross-section.

FIG. 4 illustrates the principle elements of the adaptive control system of the device for achieving the very high resolution imaging spectrometer of the invention and how these elements are integrated therein.

The invention and its various embodiments can now be better understood by turning to the following detailed description of the preferred embodiments which are presented as illustrated examples of the invention defined in the claims.

It is expressly understood that the invention as defined by the claims may be broader than the illustrated embodiments described below.

DETAILED DESCRIPTION OF THE INVENTION

A programmable, adaptive grating interferometer is a two dimensional binary grating with variable depth as shown in FIG. 1, which operates in the zero order of a diffraction pattern.

As the mirror elements of the invention move, a diffraction pattern is created for each of the mirror movement locations as shown in FIG. 2.

In this adaptive grating interferometry, the binary grating splits the wavefront to generate the interference pattern. At the grating, the wavefront is separated such that one-half of the beam is reflected by the front facets (fixed mirrors) and the other half by the back facets (mobile mirrors) as shown in FIG. 3. The resulting light from a single spectral sub-band thus falls on the two dimensional detector array of the invention which defines the imaging field of view. An image is formed over the field that is within a single spectral sub-band and is obtained at a single instant of time over the entire imaging field.

One mode of operation of the invention is to scan the movable elements in the grating which in turn produces a continuous sequence of spectral sub-band images over the two dimensional field of view and thus creates a spectral data cube. If the detector array is sampled at predetermined or user-defined selected times and not continuously, then data cubes are created that have a desirable subset of the spectral sub-band content of the original data cube.

An example of the use of such a technique could be the desire to detect certain materials present in a scene such as explosives which have a distinct spectral characteristic. Increases in integration times at selected spectral sub-bands can improve detectability by improving the signal-to-noise ratios in the selected bands. Atmospheric conditions determine the transparency of the atmosphere as a function of spectral sub-bands. If the atmospheric observing conditions are known, such as the presence of fog, rain, or dust, then sub-band selection can be optimized by a user to increase probability of detection of materials of interest. If the data outputs from initial spectral scans of regions are examined in real-time, then further optimization modes are enabled. This concept of adaptive imaging spectrometer operations is illustrated in FIG. 4.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An optical sensing apparatus comprising:
   a two-dimensional array of imaging pixels;
   a variable-spaced optical grating comprising a first reflective element and a second reflective element configured to generate a diffraction interference pattern representative of a scene onto the array;
   adaptive control electronics configured to position the first reflective element relative to the second reflective element at one or more user-defined positions whereby a unique interference pattern is generated at the position to define a one or a sequence of spectral sub-band images representative of the scene; and;
   the adaptive control electronics configured to vary an integration time of the pixels based on one or more integration time parameters.

2. The optical sensing apparatus of claim 1 wherein the integration time parameters are based on the position of the first or second reflective elements.

3. The optical sensing apparatus of claim 1 configured to observe and display a single user-defined spectral sub-band representative of the scene over the two- dimensional array.

4. The optical sensing apparatus of claim 1 configured to observe and display a plurality of user-defined spectral sub-bands representative of the scene over the two- dimensional array to define a data cube.

5. The optical sensing apparatus of claim 1 wherein the integration time is varied based at least in part on a spectral analysis of one or more previously generated interference patterns representative of the scene.

6. The optical sensing apparatus of claim 1 wherein at least one of the positions of the first or second reflective element, or a dwell-time of the first or second reflective elements at the respective positions, is determined by a user-defined set of one or both of a system priority input and an environmental condition input.

7. The optical sensing apparatus of claim 1 wherein the adaptive control electronics are further configured to perform a spectral template matching function or an anomaly detection function to determine a material or chemical content in the scene.

8. The optical apparatus of claim 1 wherein the variable-spaced grating is comprised of a MEMS-fabricated grating comprising a first comb member having a plurality of outwardly depending and spaced-apart first fingers and an optically reflective upper first facet;
   a second comb member having a plurality of outwardly depending and spaced-apart second fingers and an optically reflective upper second facet;
   wherein the first fingers are received and interleaved between the second fingers; the first comb member and the second comb member configured whereby the first facet and second facet are driven and vertically displaced with respect to each other; and;
   the adaptive control electronics element configured to vertically displace and position the first facet relative to the second facet at one or more user-defined positions to generate a unique inference pattern at the respective positions.

* * * * *